US012574302B2

(12) United States Patent
Ichihara

(10) Patent No.: US 12,574,302 B2
(45) Date of Patent: Mar. 10, 2026

(54) CONTROL OF CLOSED NETWORK USING NETWORK SLICE

(71) Applicant: RAKUTEN MOBILE, INC., Tokyo (JP)

(72) Inventor: Atsushi Ichihara, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 229 days.

(21) Appl. No.: 18/259,584

(22) PCT Filed: Dec. 27, 2022

(86) PCT No.: PCT/JP2022/048302
§ 371 (c)(1),
(2) Date: Jun. 28, 2023

(87) PCT Pub. No.: WO2024/142287
PCT Pub. Date: Jul. 4, 2024

(65) Prior Publication Data
US 2024/0388511 A1 Nov. 21, 2024

(51) Int. Cl.
*H04L 41/40* (2022.01)
*H04W 48/18* (2009.01)

(52) U.S. Cl.
CPC ............. *H04L 41/40* (2022.05); *H04W 48/18* (2013.01)

(58) Field of Classification Search
None
See application file for complete search history.

(56) References Cited

U.S. PATENT DOCUMENTS

| | | | |
|---|---|---|---|
| 11,405,967 B2 * | 8/2022 | Zhang | H04L 41/40 |
| 11,972,846 B1 * | 4/2024 | Berkshire | G16H 10/60 |
| 12,284,586 B1 * | 4/2025 | Nguyen | H04W 40/02 |
| 2021/0176327 A1 | 6/2021 | Soliman et al. | |
| 2021/0219354 A1 * | 7/2021 | Babbellapati | H04W 48/16 |
| 2023/0048066 A1 * | 2/2023 | Lei | H04L 41/0806 |

(Continued)

FOREIGN PATENT DOCUMENTS

WO    2021262045 A1    12/2021

OTHER PUBLICATIONS

"3GPP TS 38.300", Jun. 2022, 1-209 pages, V17.1.0, France, 209pp.

*Primary Examiner* — Jason D Cardone
(74) *Attorney, Agent, or Firm* — HAUPTMAN HAM, LLP

(57) ABSTRACT

To implement a closed network that is less susceptible to trouble, a communication system includes a site system (43) and a core network system (41). The site system controls communication by a terminal (Step S105), and relays data acquired from the terminal to another system arranged at a site based on the control (Step S106). The core network system controls communication by the terminal (Step S108). The site system causes the site system to control communication by the terminal in response to a request for connection to a network slice of a closed network transmitted from the terminal via a site antenna included in the site system (Step S104), and causes the core network system to control communication by the terminal in response to a request for connection to another network slice transmitted from the terminal via the site antenna (Step S107).

13 Claims, 8 Drawing Sheets

(56) References Cited

U.S. PATENT DOCUMENTS

| | | | |
|---|---|---|---|
| 2023/0134430 A1* | 5/2023 | Taylor | H04W 28/24 |
| | | | 370/329 |
| 2023/0308982 A1* | 9/2023 | Yang | H04W 40/02 |
| 2024/0056495 A1* | 2/2024 | Abougamia | H04L 67/1008 |
| 2024/0129808 A1* | 4/2024 | Cui | H04L 41/40 |
| 2024/0244110 A1* | 7/2024 | Lee | H04L 67/14 |
| 2024/0314058 A1* | 9/2024 | Mueck | H04L 41/40 |
| 2025/0227538 A1* | 7/2025 | Min | H04L 47/125 |
| 2025/0287256 A1* | 9/2025 | Dahlfort | H04W 28/0215 |

* cited by examiner

CONTROL OF CLOSED NETWORK USING NETWORK SLICE

RELATED APPLICATIONS

The present application is a National Phase of International Application Number PCT/JP2022/048302, filed Dec. 27, 2022.

TECHNICAL FIELD

The present disclosure relates to control of a closed network using a network slice.

BACKGROUND ART

There is a technology for using a network slice, which virtually divides (slices) a network, as a closed network that is resistant to intrusion from the outside.

In 3GPP (trademark) TS 38.300 V17.1.0 (2022 June) "16.3.4.2 AMF and NW Slice Selection," it is disclosed that a RAN selects an AMF in accordance with NSSAI or the like supplied from a UE.

SUMMARY OF INVENTION

Technical Problem

A function (for example, AMF) of controlling the network slice is usually arranged in a data center of a mobile communication network itself, not at a site included in the closed network. Thus, when a trouble occurs in the communication between the data center and the site in the closed network or in the data center itself, the closed network cannot be used even at the site.

The present disclosure has been made in view of the above-mentioned issue, and has an object to provide a technology for implementing a closed network that is less susceptible to troubles such as equipment failure.

Solution to Problem

In order to solve the above-mentioned issue, according to one embodiment of the present disclosure, there is provided a communication system including: a site system arranged at a site and including a site antenna and one or more processors; and a core network system connected to the site system and including one or more processors. The communication system causes at least one of the one or more processors included in the site system to execute a site request process, a site control process, and a site relay process. In the site control process, communication by the terminal is controlled. In the site relay process, communication to and from the terminal is performed based on the control, and data acquired from the terminal is relayed to another system arranged at the site. The communication system causes at least one of the one or more processors included in the core network system to execute a core control process of controlling communication by the terminal. In the site request process, in response to a request for connection to a network slice of a predetermined closed network transmitted from the terminal via the site antenna, the site system is requested to execute the site control process on communication by the terminal, and in response to a request for connection to a network slice different from the network slice of the predetermined closed network transmitted from the terminal via the site antenna, the core network system is requested to execute the core control process on communication by the terminal in the network slice different from the network slice of the predetermined closed network. The site relay process is started in response to the request for the site control process by the site request process.

Further, according to one embodiment of the present disclosure, there is provided a communication control method including: causing at least one of one or more processors included in a site system arranged at a site to: control communication by a terminal; and communicate to and from the terminal based on the control and relay data acquired from the terminal to another system arranged at the site; and causing at least one of one or more processors included in a core network system to control communication by the terminal. The method also includes causing at least one of the one or more processors included in the site system to cause, in response to a request for connection to a network slice of a predetermined closed network transmitted from the terminal via a site antenna included in the site system, at least one of the one or more processors included in the site system to control communication by the terminal, and cause, in response to a request for connection to a network slice different from the network slice of the predetermined closed network transmitted from the terminal via the site antenna, at least one of the one or more processors included in the core network system to control communication by the terminal in the network slice different from the network slice of the predetermined closed network. The method further includes starting relay between the terminal and the another system via the site antenna when the control of the communication by the at least one of the one or more processors included in the site system is started.

DESCRIPTION OF EMBODIMENTS

An embodiment of the present disclosure is now described in detail with reference to the drawings.

Figure 1:
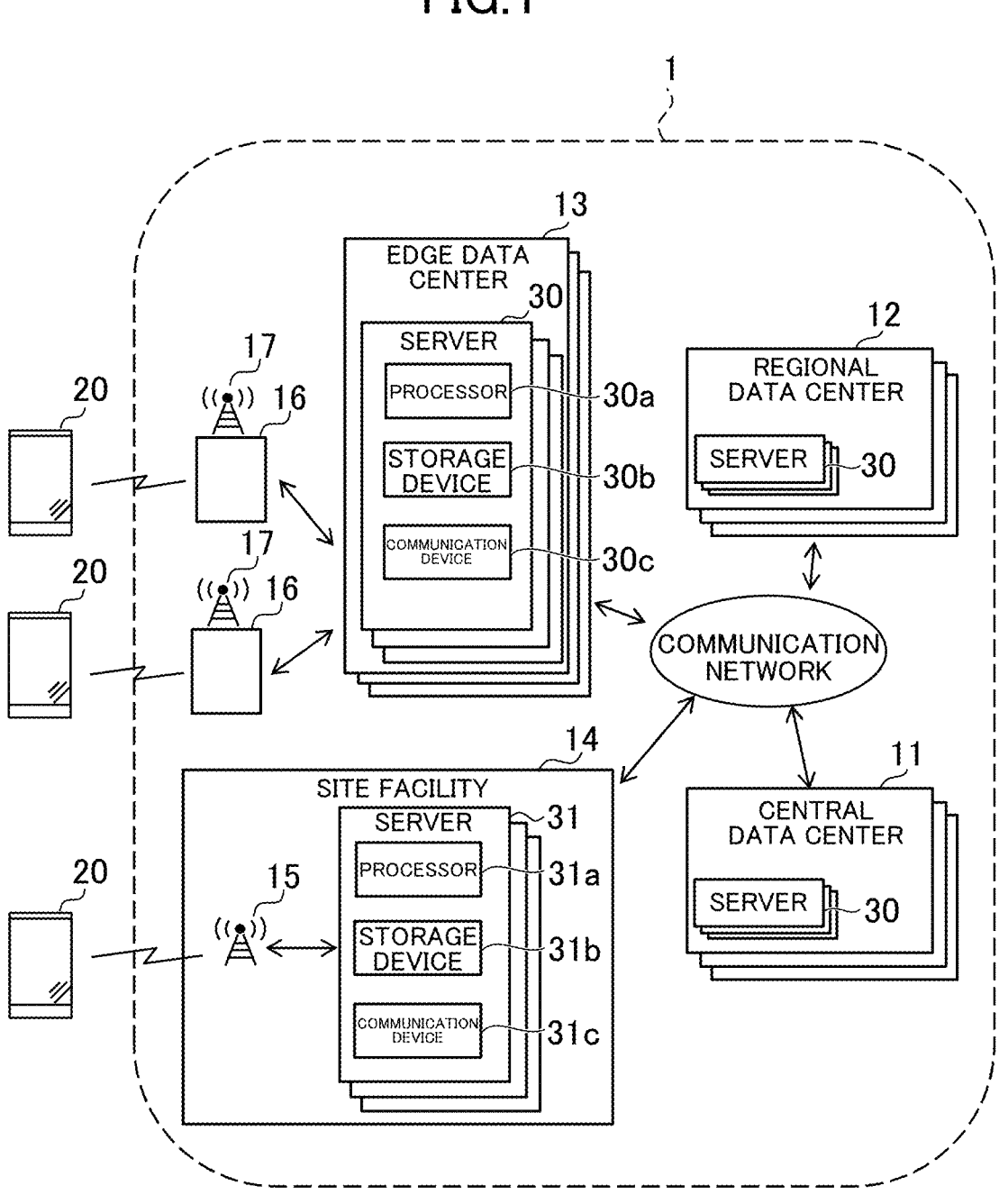
FIG. 1 is a diagram for illustrating an example of a communication system in an embodiment of the present disclosure.
Figure 2:
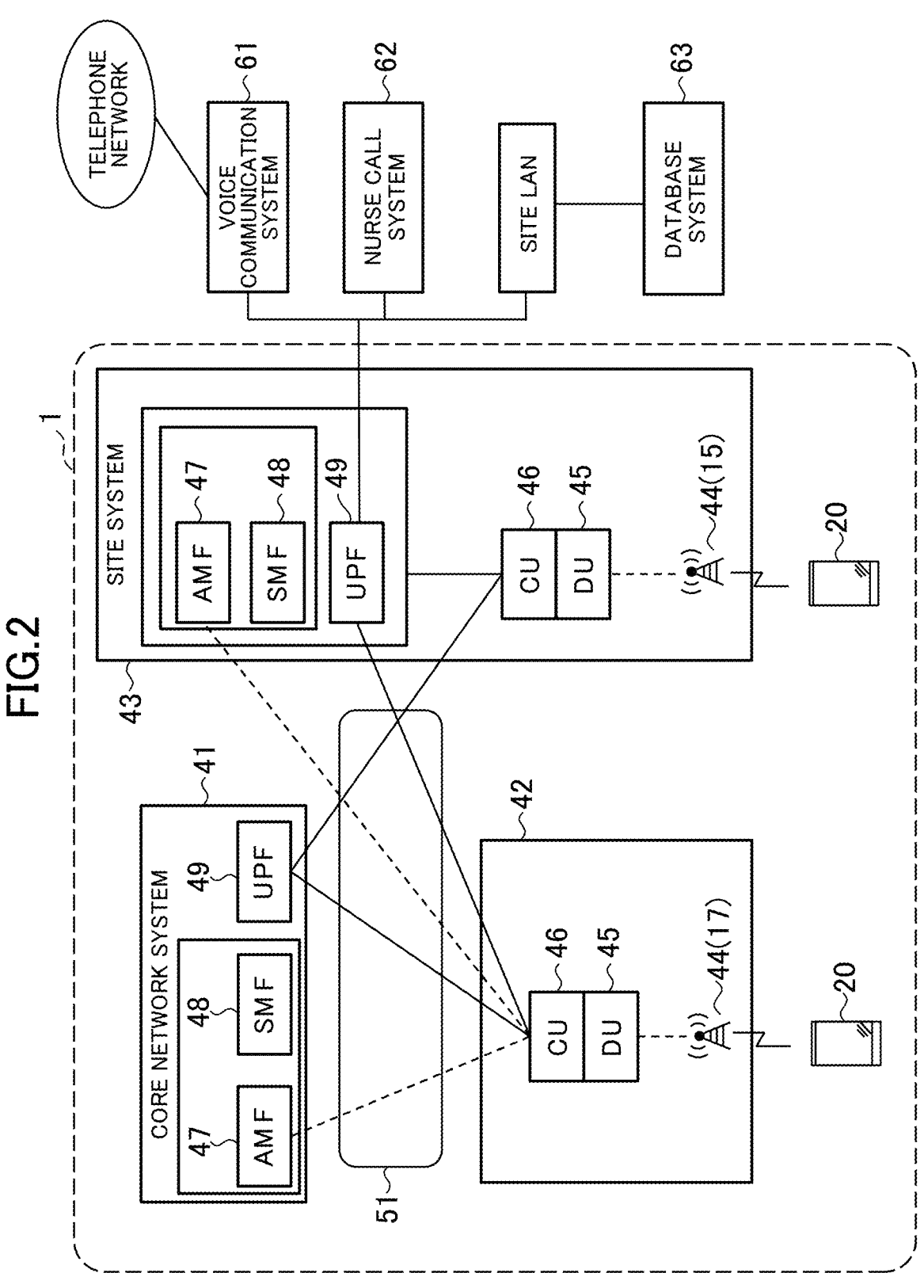
FIG. 2 is a diagram for schematically illustrating the communication system in the embodiment.

FIG. 1 and FIG. 2 are each a diagram for illustrating an example of a communication system 1 in the embodiment of the present disclosure. FIG. 1 is an illustration drawn with attention being given to locations of facilities included in the communication system 1. The communication system 1 provides a mobile communication network. A specific network slice of the provided mobile communication network provides a closed network which connects to a system arranged at a site. As used herein, a simple description "closed network" means the closed network provided by the specific network slice.

As illustrated in FIG. 1, the communication system 1 includes, as facilities, central data centers 11, regional data centers 12, edge data centers 13, a site facility 14, and base station facilities 16. Each base station facility 16 is a facility for wireless mobile communication to and from a terminal 20. Each base station facility 16 includes an antenna 17 and a radio unit (RU), which is described later. Each site facility 14 includes an antenna 15, an RU (not shown), and a plurality of servers 31. The site facility 14 corresponds to a site such as a hospital facility or an office building, for example.

The terminals 20 are referred to as "user equipment (UE)." Each terminal 20 is a mobile terminal such as a smart phone, and can be connected to a mobile communication network by wireless communication. Some of the terminals 20 are configured such that the terminals access the network slice of the closed network, while the other terminals are not.

The central data centers 11, the regional data centers 12, and the edge data centers 13 are collectively referred to as data center group. For example, there are several central data centers 11, several tens of regional data centers 12, and several thousand to several tens of thousands of edge data centers 13.

For example, the central data centers 11 are dispersedly arranged in an area (for example, in Japan) covered by the communication system 1. The regional data centers 12 are dispersedly arranged in the area covered by the communication system 1. For example, when the area covered by the communication system 1 is the entire area of Japan, one or two regional data centers 12 may be arranged in each prefecture.

Each of the edge data centers 13 can communicate to and from the base station facility 16. One edge data center 13 may be capable of communicating to and from a plurality of the base station facilities 16.

In this embodiment, for example, the central data centers 11, the regional data centers 12, and the edge data centers 13 can communicate to and from each other via a communication network. Further, the central data centers 11, the regional data centers 12, and the edge data centers 13 can communicate among themselves via a communication network.

A plurality of servers 30 are arranged in each of the central data centers 11, the regional data centers 12, and the edge data centers 13 in this embodiment.

Each of the plurality of servers 30 includes one or more processors 30a, a storage device 30b, and a communication device 30c. The plurality of servers 30 arranged in the central data centers 11, the regional data centers 12, and the edge data centers 13 provide a kind of cloud platform by a virtualized application execution environment, which is described later.

Further, each of the plurality of servers 31 arranged at the site facility 14 includes one or a plurality of processors 31a, a storage device 31b, and a communication device 31c. A virtualized application execution environment is implemented in the plurality of servers 31.

The processors 30a and 31a are each a program control device such as a microprocessor which operates in accordance with a program. The storage device 30b is, for example, a storage element, such as a ROM or RAM, a solid state drive (SSD), a hard disk drive (HDD), or the like. The storage devices 30b and 31b each store a program to be executed by the processor 30a or 31a, and the like. The communication devices 30c and 31c are each, for example, a communication interface, such as a network interface controller (NIC) or a wireless local area network (LAN) module. The communication devices 30c and 31c each exchange data with other servers or network devices. The communication devices 30c and 31c may each form a part of software-defined networking (SDN).

In this embodiment, a container-type virtualized application execution environment such as Docker (trademark) is installed in the servers 30 arranged in the central data center 11, the regional data center 12, and the edge data center 13. The container-type virtualized application execution environment, can deploy containers in those servers 30 and can operate those. In those servers 30, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

A container-type virtualized application execution environment and a container management tool may also be installed on the servers 31. A cluster formed of one or more containers generated by such a virtualization technology may be constructed in those servers 31.

FIG. 2 is a diagram for schematically illustrating the communication system 1 in this embodiment. FIG. 2 is a diagram for illustrating internal functions and processes of the communication system 1 in particular.

The communication system 1 includes, in terms of function and processes, a core network system 41, a plurality of base station systems 42, a site system 43. The core network system 41, the base station systems 42, and the site system 43 are connected by a software-defined network (SDN) 51 so that the systems can communicate to and from each other.

Each base station system 42 includes a distributed unit (DU) 45 and a central unit (CU) 46. The core network system 41 includes a plurality of access and mobility management functions (AMFs) 47, a plurality of session management functions (SMFs) 48, and a plurality of user plane functions (UPFs) 49. Each base station system 42 includes a radio unit (RU) 44 and an antenna 17, and the RU 44 is a radio transceiver which communicates to and from the terminals 20. The RUs 44 are mainly arranged at the base station facilities 16 and the site facility 14, and communicate to and from the DU 45 of the same base station system 42. The site system 43 also includes an RU 44, a DU 45, a CU 46, an AMF 47, an SMF 48, and a UPF 49. The site system 43 includes the RU 44 and the antenna 15 arranged at the site, and the RU 44 is a radio transceiver. The RU 44 communicates to and from the DU 45 of the same site system 43.

The functions and the processes of the core network system 41 and the base station systems 42 may be implemented by one or more processors 30a included in one or more servers 30 executing programs (executive instruction) stored in the storage device 30b. A so-called container management tool may manage the storage of the programs (program modules) corresponding to respective modules in the storage device 30b and the execution by the processor(s) 30a.

Further, the functions and the processes of the site system 43 may be implemented by one or more processors 31a included in one or more servers 31 executing programs (executive instruction) stored in the storage device 31*b*. A so-called container management tool may manage the storage of the programs (program modules) corresponding to respective modules in the storage device 31*b* and the execution by the processor(s) 31*a*.

The DUs 45 and the CUS 46 included in the base station systems 42 and the site system 43 are each 5G DUs and CUs. The DUs 45 process uplink signals acquired from the terminals 20 via the RUs 44. The DUs 45 acquire the uplink signals from the terminals 20 via the RUs 44. The DUs 45 also convert downlink data destined for the terminals 20 to downlink signals for wireless transmission. The downlink signals are wirelessly transmitted from the RUs 44.

The DUs 45 may include, for example, the functions of a PHY-High layer, a MAC layer, and an RLC layer in so-called 4G and 5G. Further, the functions of the CUs 46 may include the functions of a PDCP layer and a PRC/SDAP layer. The boundaries of the function layers between the DUs 45 and the CUS 46 may differ from the example described above. The MAC layer performs wireless resource allocation, for example, and the RLC layer performs retransmission control, for example.

As used herein, an uplink signal is the signal input from the terminal 20 side to the DU 45, and a downlink signal is the signal that is output from the DU 45 toward the terminal 20. Data output from the DU 45 to the core network system 41 (for example, AMF 47 or UPF 49) is uplink data, and data output from core network system 41 to the DU 45 is downlink data.

The DUs 45 and the CUS 46 included in the base station systems 42 are mainly arranged in the edge data centers 13. More specifically, those DUs 45 and CUs 46 may be implemented by one or more servers 30 arranged at the edge data centers 13. A given edge data center 13 may include a plurality of sets each including one or a plurality of DUs 45 and one CU 46, and the plurality of DUs 45 included in the set may be connected to the CU 46 of the set. The DUs 45 and the CUS 46 included in the base station systems 42 may be arranged in a data center different from the edge data center 13.

The DUs 45 and the CUS 46 included in the site system 43 may be implemented by one or more servers 31 arranged at the site facility 14.

The DUs 45 and the CUS 46 included in the base station systems 42 and the site system 43 may be virtual distributed units (vDUs) and virtual central units (vCUs) in 4G, respectively. A part of the DUs 45 and the CUS 46 may be implemented in the central data centers 11 or the regional data centers 12 instead of the edge data centers 13. The RUs 44, the DUs 45, and the CUS 46 form a radio access network (RAN).

The RAN is a computer system which is provided with the antenna, and corresponds to an eNodeB (eNB) in a fourth generation mobile communication system (hereinafter referred to as "4G") and an NR base station (gNB) in a fifth generation mobile communication system (hereinafter referred to as "5G"). The core network system 41 and the RAN cooperate with each other to implement a mobile communication network which communicates to and from the terminal 20.

The CU 46 included in the site system 43 executes a site request process by using at least one of the one or more processors 31*a*. In the site request process, the CU 46 requests the AMF 47 corresponding to the network slice to which the terminal 20 requests connection to control communication. The CU 46 included in the base station system

42 executes an external request process by using at least one of the one or more processors 30*a*. Details of those processes are described later.

The core network system 41 is a system corresponding to an evolved packet core (EPC) in 4G or a 5G core (5GC) in 5G. The core network systems 41 in this embodiment are implemented mainly by the plurality of servers 30 arranged in the central data centers 11 or the regional data centers 12. As described above, the core network system 41 includes NEs such as a plurality of AMFs 46, a plurality of SMFs 48, and a plurality of UPFs 49, as software functional units. The core network system 41 is connected to an external network such as the Internet.

The AMF 47 receives a connection request from the terminal 20 via the gNB, and authenticates the terminal 20. When the terminal 20 is authenticated, the AMF 47 registers information for enabling incoming calls to the terminal 20 (information indicating the position of the terminal 20) in an internal database. When the terminal 20 is authenticated after the AMF 47 receives the connection request, the SMF 48 establishes a communication path (PDU session) between the terminal 20 and an appropriate UPF 49. The AMF 47 and the SMF 48 included in the core network system 41 form a core control module which controls communication between the terminal 20 and the mobile communication network.

For example, when connection to the network slice of the closed network is requested, the SMF 48 may establish a communication path between the UPF 49 included in the site system 43 and the terminal 20. Further, when connection to a network slice different from that of the closed network is requested, the SMF 48 may establish a communication path between the UPF 49 included in the core network system 41 and the terminal 20.

The core control module included in the core network system 41 executes a core control process by using at least one of the one or more processors 30*a*. In the core control process, the core control module controls communication by the terminal 20.

A UPF 49 included in the core network system 41 uses at least one of the one or more processors 30*a* to execute a core relay process for relaying communication data between the terminal 20 and an external network such as the Internet. After the core control process receives a request to control communication by the terminal 20 in the network slice of the closed network (strictly speaking, after the communication path between the terminal 20 and the UPF 49 is established), the UPF 49 starts communication to and from the terminal 20 as the core relay process.

The AMF 47, the SMF 48, and the UPF 49 included in the site system 43 each have the same function as in the core network system 41, but are arranged in the site facility 14. Further, those AMF 47, SMF 48, and UPF 49 are capable of performing a process on the network slices of a closed network. Moreover, depending on the usage or the like of the network slice, the AMF 47 included in the site system 43 can process the network slices different from those of the closed network in place of the AMF 47 of the core network system 41. The AMF 47 and the SMF 48 included in the site system 43 form a site control module which controls communication between the terminal 20 and the closed network of the mobile communication network.

The site control module executes a site control process for controlling communication by the terminal 20 by using at least one of the one or more processors 31*a*.

In the site request process, the CU 46 included in the site system 43 selects one of the site control process and the core control process (the AMF 47 of the core network system 41 and the site system 43) and requests communication control. More specifically, in the site request process, when the CU 46 receives a request for connection to the network slice of the closed network from the terminal 20 via the antenna 15 of the site, the CU 46 requests the site control process to control communication by the terminal 20. Meanwhile, when the CU 46 receives a request for connection to a network slice different from the network slice of the closed network from the terminal 20 via the antenna 15, the CU 46 requests the core control process to control communication by the terminal 20 in the network slice different from the network slice of the closed network.

Meanwhile, the CU 46 included in the base station system 42 requests the core control process (strictly speaking, the AMF 47 of the core network system 41) to control communication in the case of a request for connection to the network slice of the closed network as well as in the case of a request for connection to a different network slice. In this case, the CU 46 may change the type of AMF 47 to request control in accordance with the network slice to which the terminal 20 requests connection, or may request control by the same type of AMF 47.

The UPF 49 included in the site system 43 executes a site relay process by using at least one of the one or more processors 31$a$. In the site relay process, the UPF 49 communicates to and from the terminal 20 based on control by the site control process, and relays data acquired from the terminal 20 to another system arranged at the site (another system connected to the closed network). Further, after the site control module receives a request to control communication from the CU 46 (strictly speaking, after the communication path between the terminal 20 and the UPF 49 is established), in the site relay process, the UPF 49 starts communication to and from the terminal 20 via the antenna 15 of the site.

The another system includes, for example, at least one of a voice communication system 61, a nurse call system 62, or a database system 63. The site system 43 may be connected to a system different from the systems illustrated in FIG. 2, or may not be connected to a part of the other systems illustrated in FIG. 2. A part of the other systems illustrated in FIG. 2 may not be present.

The voice communication system 61 is a system which implements a call via a telephone line between an external telephone device and an extension telephone device (for example, terminal 20), or a call between extension telephone devices. The voice communication system 61 may include, for example, a session initiation protocol (SIP) server. The functions and processes of the voice communication system 61 and the nurse call system 62 may be implemented by one or more processors 31$a$ included in one or more servers 31 executing programs stored in the storage device 31$b$. Further, the voice communication system 61 and the nurse call system 62 may be implemented by a server different from the server 31 which is connected via a site LAN.

The database system 63 is a computer-implemented system which includes a database. The database system 63 may be, for example, a medical chart management system in a hospital. In FIG. 2, the database system 63 is connected to the UPF 49 via a secure site LAN. The database system 63 may be implemented by one or more servers 31, or may be connected to the UPF 49 without going through a LAN.

When the terminal 20 communicates data to and from another system via the antenna 15 of the site facility 14, the communication is performed via the UPF 49 of the site system 43, and hence the core network system 41 is not used. This is called "local breakout." Local breakout enables efficient communication between the terminal 20 and other systems at the site. Further, when the AMF 47 and the SMF 48 of the core network system 41 are not used, even when a trouble occurs in the communication to and from the core network system 41 or between the site system 43 and the core network system 41, the closed network communication at the site can be maintained. As a result, it is possible to prevent the closed network connected to a system at the site from stopping due to a failure.

There is now described a method for implementing the functions of the communication system 1 in this embodiment. The communication system 1 is formed of a plurality of functional units (for example, network functions (NFs)) in order to implement network services. In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or more CNFs. The functional unit in this embodiment may also correspond to a network node.

Figure 3:
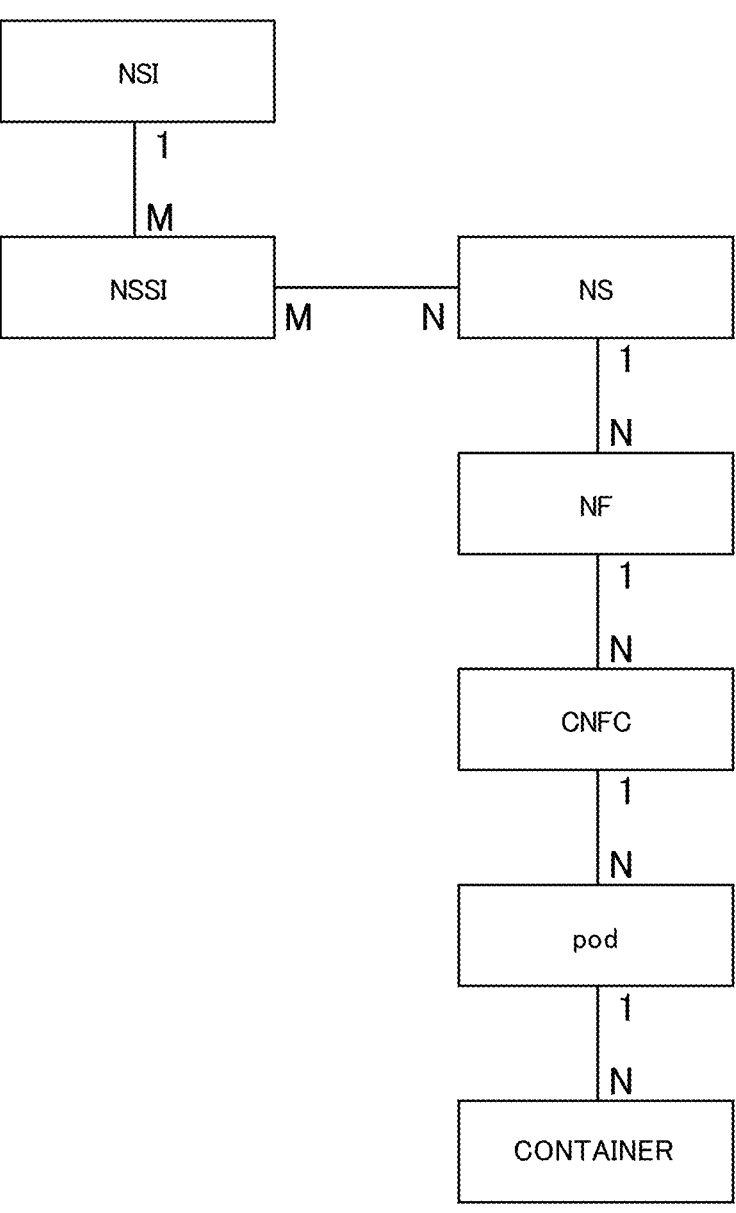
FIG. 3 is a diagram for illustrating an example of links between elements constructed in the communication system in the embodiment.

FIG. 3 is a diagram for schematically illustrating an example of links between elements constructed in the communication system 1 in this embodiment. Symbols M and N indicated in FIG. 3 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 3, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB).

In 5G, the NF corresponds to an element having a granularity, such as the DU 45, the CU 46, or the UPF 49. The NF also corresponds to an element having a granularity, such as the AMF 47, the SMF, or the UPF 49. In 4G, the NF corresponds to an element having a granularity, such as a mobility management entity (MME), a home subscriber server (HSS), a serving gateway (S-GW), a vDU, or a vCU. In this embodiment, for example, one NS includes one or more NFs. That is, one or more NFs are under the control of one NS.

The CNFC corresponds to an element having a granularity, such as DU mgmt or DU processing. The CNFC may be a microservice deployed on the server 30 as at least one container. For example, some CNFCs may be microservices that provide a part of the functions of the DU 45, the CU 46, and the like. Some CNFCs may be microservices that provide a part of the functions of the UPF 49, the AMF 47, the SMF, and the like. In this embodiment, for example, one NF includes one or more CNFCs. That is, one or more CNFCs are under the control of one NF.

The pod refers to, for example, the minimum unit for managing a Docker container by Kubernetes. In this embodiment, for example, one CNFC includes one or more pods. That is, one or more pods are under the control of one CNFC.

In this embodiment, for example, one pod includes one or more containers. That is, one or more containers are under the control of one pod.

In addition, as illustrated in FIG. 3, a network slice (NSI) and a network slice subnet instance (NSSI) have a hierarchical structure.

The NSIs can be said to be end-to-end virtual circuits that span a plurality of domains (for example, from the RAN to the core network system 41). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a mobile back haul (MBH) domain, or a slice of a core network domain.

In this embodiment, for example, one NSI includes one or more NSSIs. That is, one or more NSSIs are under the control of one NSI. In this embodiment, a plurality of NSIs may share the same NSSI.

In addition, as illustrated in FIG. 3, the NSSI and the NS generally have a many-to-many relationship.

In addition, in this embodiment, for example, one NF can belong to one or more network slices. Specifically, for example, network slice selection assistance information (NSSAI) including one or more pieces of sub-network slice selection assist information (S-NSSAI) can be set for one NF. In this case, the S-NSSAI is one piece of information for identifying the network slice. At least a part of the NFs are not required to belong to the network slice.

Figure 4:
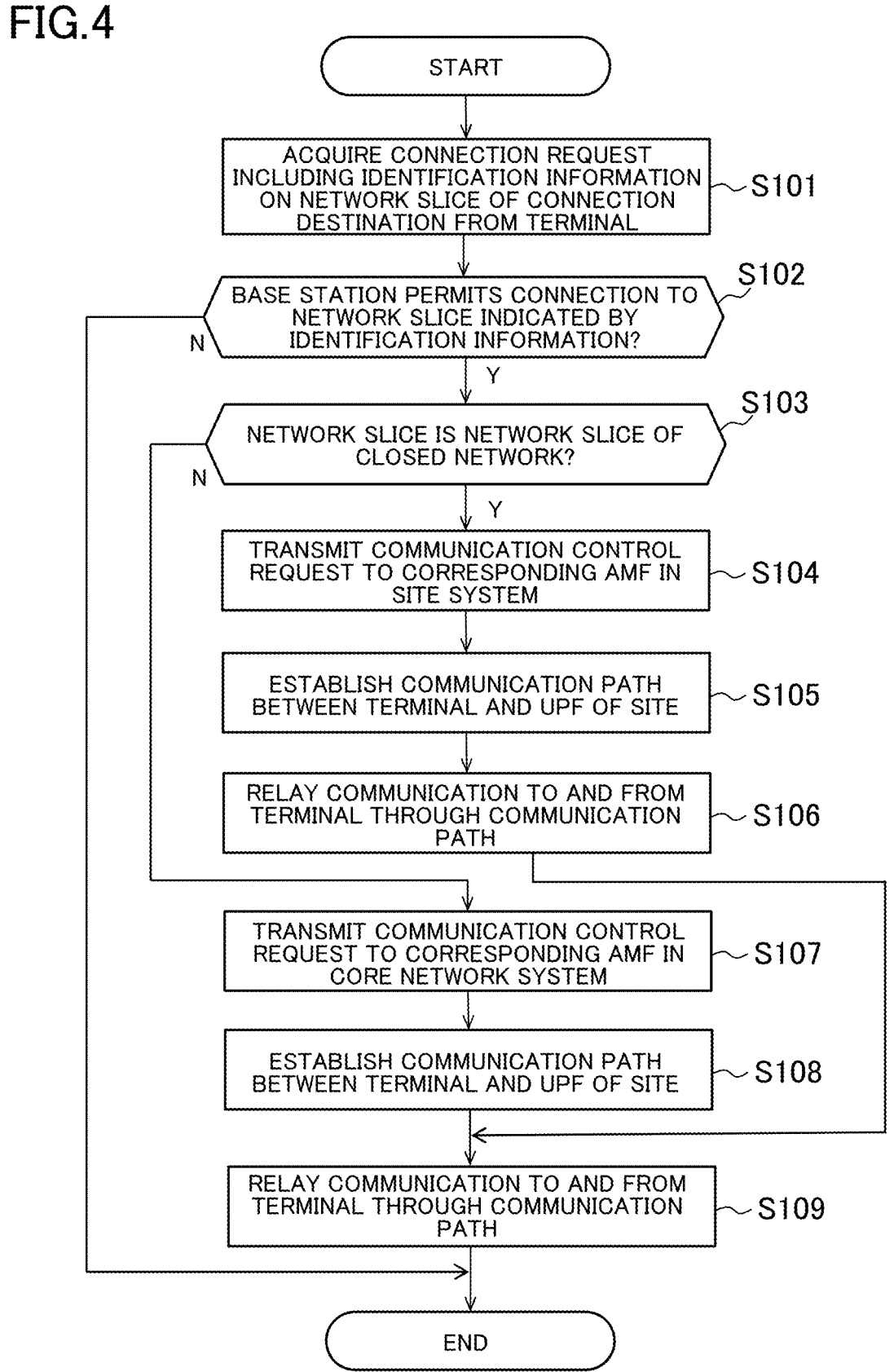
FIG. 4 is a flow chart for illustrating an outline of a process of the communication system performed when a terminal connects to a mobile communication network.

Next, the operation performed when the terminal 20 connects to the mobile communication network is described. FIG. 4 is a flow chart for illustrating an outline of a process of the communication system 1 performed when the terminal 20 connects to the mobile communication network. In FIG. 4, there is illustrated a process performed when the terminal 20 starts communication via the antenna 15 arranged at the site facility 14. A specific procedure for connecting the terminal 20 to the mobile communication network is publicly known, and thus in FIG. 4, an illustration of processes which are not particularly related to connection to the network slice of the closed network is omitted.

It is assumed that the CUS 46 included in the site system 43 and the base station system 42 have a list of network slices registered in advance, the network slices are supported by the base station including the CU 46, and that communication to and from the AMFs 47 corresponding to those supported network slices is enabled in advance. The AMFs 47 corresponding to the network slices may be configured based on the method as described in "16.3.4.2 AMF and NW Slice Selection" of 3GPP TS 38.300 V17.1.0 (2022 June).

First, the terminal 20 transmits, to the CU 46 via the antenna 15, a connection request including identification information on the network slice for which connection is desired, and in the site request process, the CU 46 acquires the connection request from the terminal 20 (Step S101). The network slice identification information may be, for example, the S-NSSAI included in the NSSAI from the terminal 20, or may be other information. Of the process steps illustrated in FIG. 4, the process steps to be performed by the CU 46 are included in the site request process. When the connection request does not include the identification information on the network slice, the network slice is not used.

Next, in the site request process, the CU 46 examines whether or not the base station permits connection to the network slice indicated by the identification information acquired from the terminal 20 (Step S102). The CU 46 may determine that the connection is permitted when the identification information acquired from the terminal 20 is registered in the list of network slices supported by the base station. When the connection to the network slice indicated by the identification information acquired from the terminal 20 is not permitted ("N" in Step S102), the process of FIG. 4 ends and the terminal 20 is not connected.

Meanwhile, when the connection to the network slice indicated by the identification information acquired from the terminal 20 is permitted ("Y" in Step S102), the CU 46 determines whether or not the network slice to which the terminal 20 requests connection is the network slice of the closed network (Step S103).

When the network slice to which connection is requested is the network slice of the closed network ("Y" in Step S103), the CU 46 transmits a communication control request to the corresponding site control module (AMF 47) included in the site system 43 (Step S104). The site control module then executes processes such as authentication of the terminal 20, and the site control module (SMF 48) establishes a communication path (PDU session) between the terminal 20 and the UPF 49 included in the site system 43 (Step S105). The UPF 49 then relays communication between the terminal 20 and other systems or the like through the communication path (Step S106).

Meanwhile, when the network slice to which connection is requested is a network slice different from that of a closed network or when the connection request does not contain the identification information on the network slice ("N" in Step S103), the CU 46 transmits a communication control request to the corresponding core control module (AMF 47) included in the core network system 41 (Step S107). The core control module then executes processes such as authentication of the terminal 20, and the core control module (SMF 48) establishes a communication path (PDU session) between the terminal 20 and the UPF 49 included in the core network system 41 (Step S108). The UPF 49 then relays communication between the terminal 20 and the external network through the communication path (Step S109).

Step S103 of FIG. 4 is illustrated as an explicit determination process, but instead of the process, the CU 46 may acquire information indicating the AMF 47 stored in association with the network slice to which connection is requested, and transmit the control requests to the acquired AMF 47. In this case, in the CU 46 included in the site system 43, a list of the network slices of a closed network and the network slices for Internet access may be registered, the information on the AMF 47 of the site system 43 may be stored in association with the network slices of the closed network, and the AMF 47 of the core network system 41 may be stored in association with a network slice for Internet access.

In this case, when the terminal 20 starts communication via the antenna 17 included in the base station system 42, a similar but different process from that of FIG. 4 is executed. Description is now given of the differences between the process performed when the terminal 20 starts communication via the antenna 17 and the process of FIG. 4. Instead of the site request process by the CU 46 of the site system 43, a base station request process by the CU 46 included in the base station system 42 is executed, and in Step S104, the CU 46 transmits the communication control request not to the site system 43 but to the site control module (AMF 47) corresponding to the site system 43. Further, the process step of Step S105 is executed by the core control module in the core network system 41. The AMF 47, which is the destination in Step S104 and Step S107, may be the same, or may be different for each network slice.

Next, the actual communication route between the CU 46 and the AMF 47 and the communication route between the terminal 20 and the UPF 49 are described.

Figure 5:
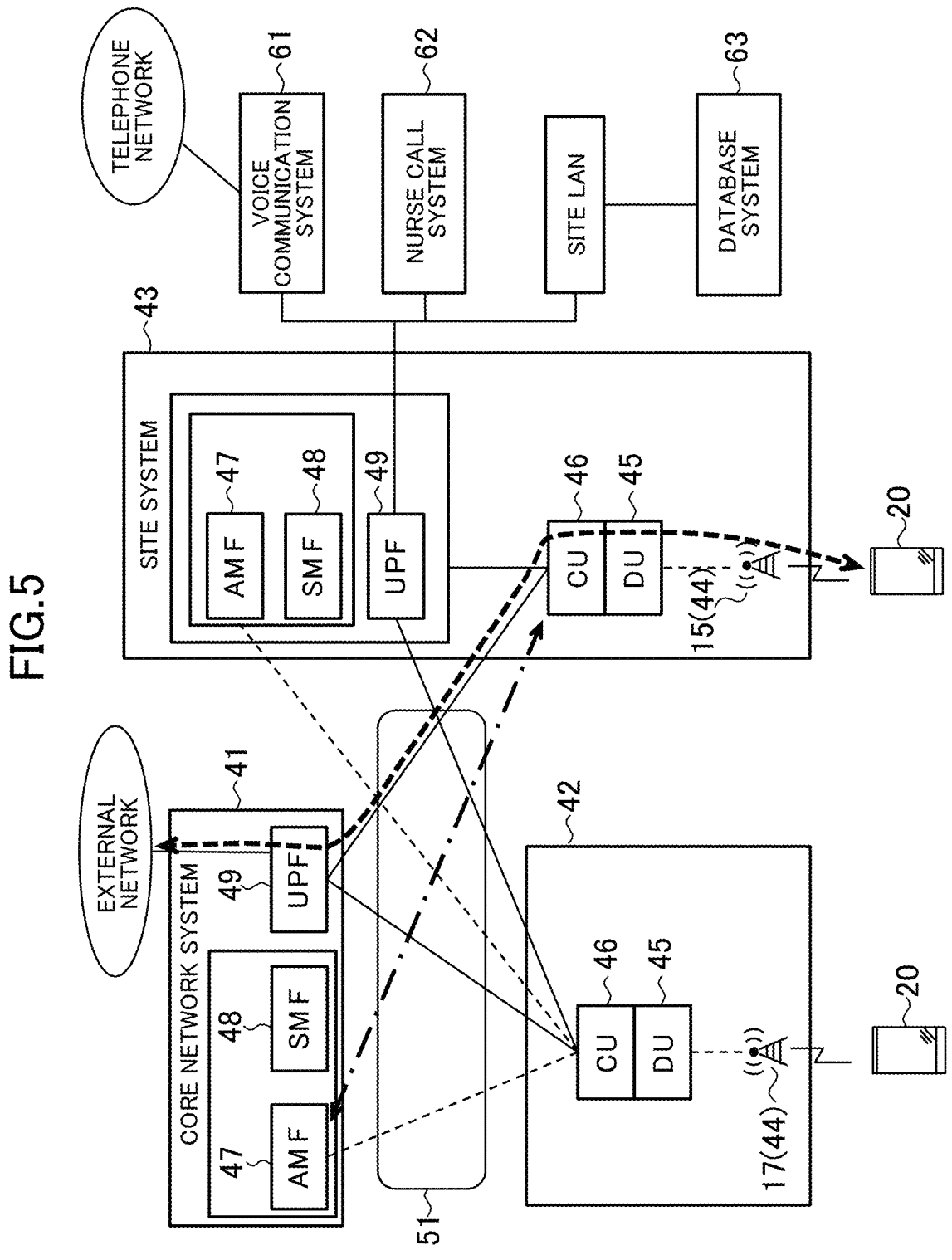
FIG. 5 is a diagram for illustrating an example of a communication route used when a terminal accesses an external network via a site antenna.

FIG. 5 is a diagram for illustrating an example of a communication route used when the terminal 20 accesses an external network such as the Internet via the antenna 15 of the site. In the example of FIG. 5, it is assumed that the terminal 20 accesses the mobile communication network via the antenna 15 of the site, and the terminal 20 requests connection to a network slice other than the network slice of the closed network. In FIG. 5, there is illustrated a communication route for access by a general terminal 20 not available for a so-called closed network.

In this case, a communication control request is transmitted from the CU 46 of the site system 43 to the AMF 47 in the core network system 41 (see the dash-dotted arrows). Then, a communication path is established between the terminal 20 and the UPF 49 in the core network system 41, and the UPF 49 relays communication (see the dashed arrows) between the terminal 20 and the external network.

Figure 6:
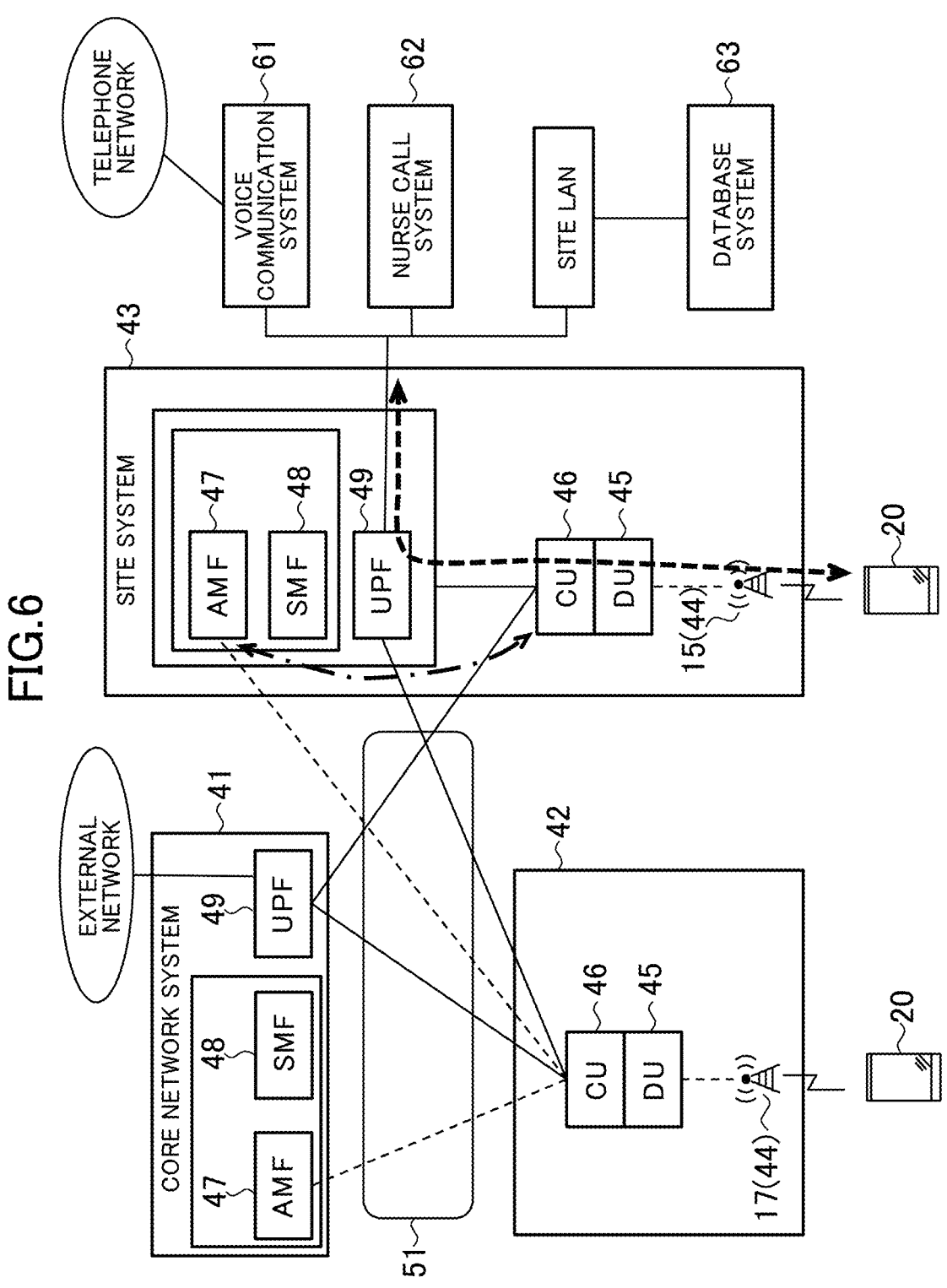
FIG. 6 is a diagram for illustrating an example of a communication route used when the terminal accesses a closed network via the site antenna.

FIG. 6 is a diagram for illustrating an example of a communication route used when the terminal 20 accesses a closed network via the antenna 15 of the site. In the example of FIG. 5, it is assumed that the terminal 20 accesses the mobile communication network via the antenna 15 of the site, and the terminal 20 requests connection to the closed network. In this case, a communication control request is transmitted from the CU 46 to the AMF 47 in the site system 43, and the UPF 49 in the site system 43 relays communication between the terminal 20 and the other systems (such as the voice communication system 61).

Figure 7:
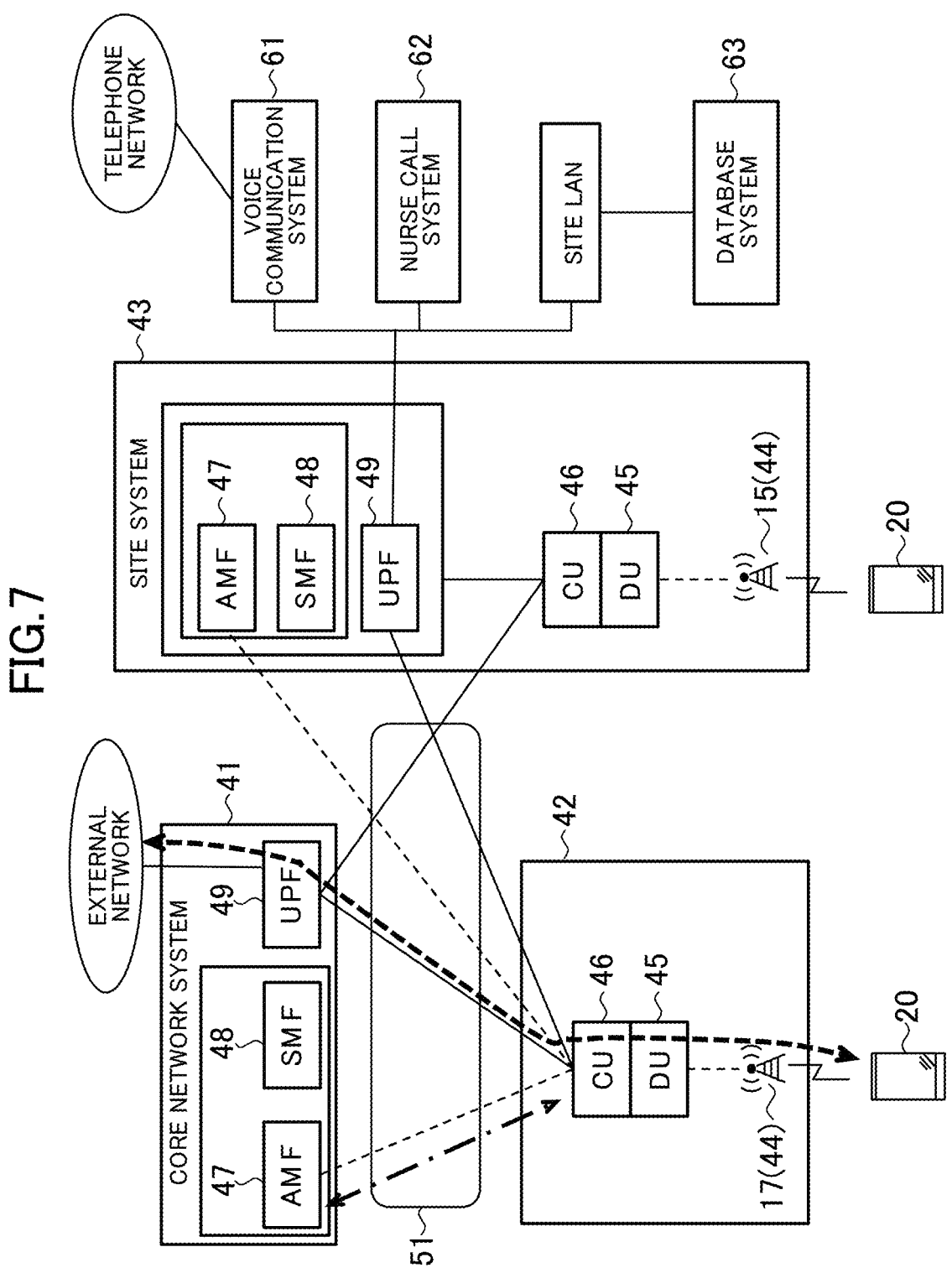
FIG. 7 is a diagram for illustrating an example of a communication route used when the terminal accesses the external network via an antenna outside the site.

Description is now also given of a case in which the terminal 20 communicates via the antenna 17 arranged in a base station system 42 outside a site. FIG. 7 is a diagram for illustrating an example of a communication route used when the terminal 20 accesses an external network via the antenna 17 outside the site. In the example of FIG. 7, it is assumed that the terminal 20 accesses the mobile communication network via the antenna 17, and the terminal 20 requests connection to a network slice other than the network slice of the closed network.

In this case, a communication control request is transmitted from the CU 46 of the base station system 42 to the AMF 47 in the core network system 41 (see the dash-dotted arrows). Then, a communication path is established between the terminal 20 and the UPF 49 in the core network system 41, and the UPF 49 relays communication (see the dashed arrows) between the terminal 20 and the external network. In the example of FIG. 7, the difference from the example of FIG. 5 is mainly that the antenna 15, the DU 45, and the CU 46 through which communication passes are inside the base station system 42.

Figure 8:
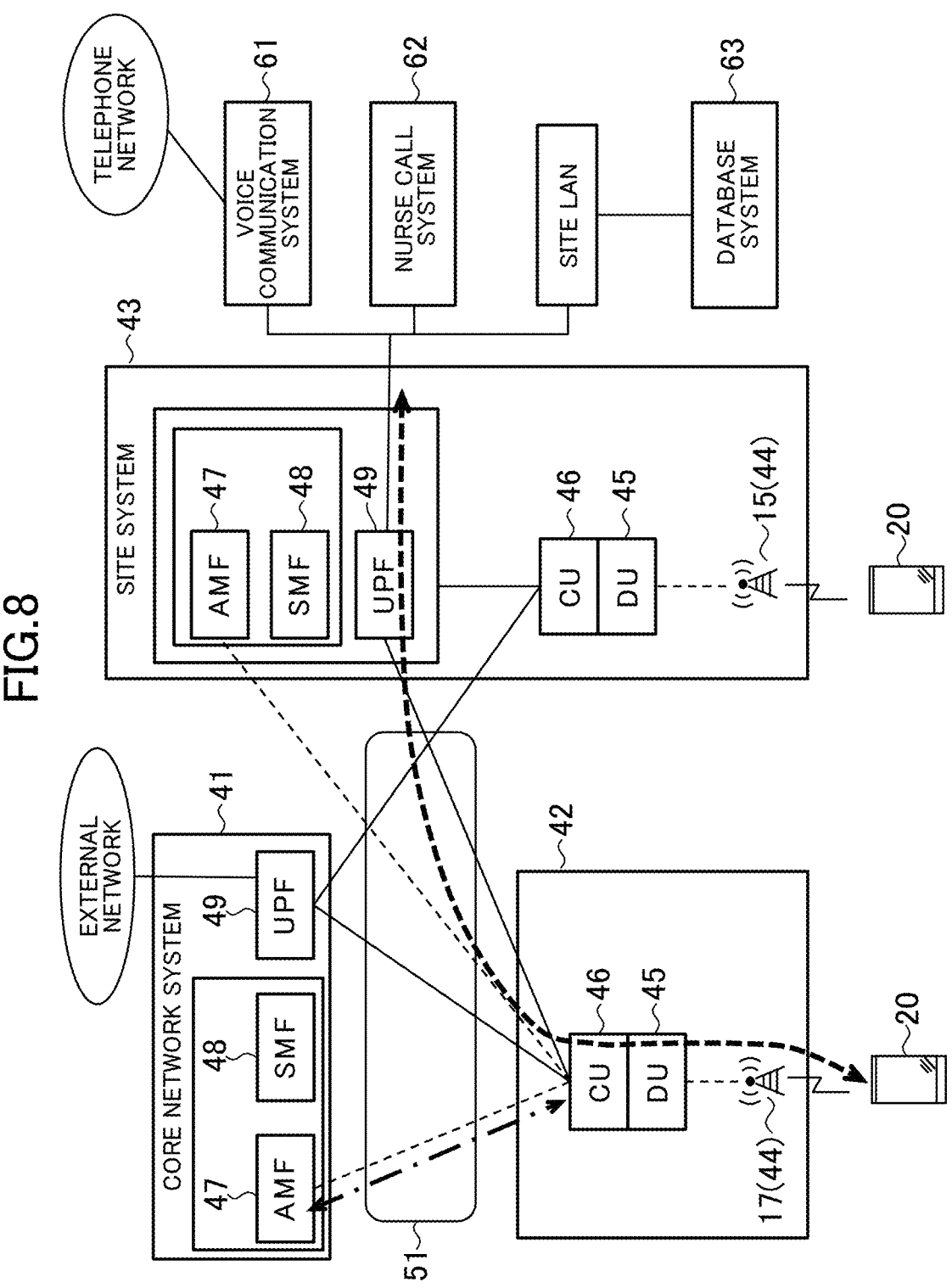
FIG. 8 is a diagram for illustrating another example of a communication route used when the terminal accesses the closed network via the antenna outside the site.

FIG. 8 is a diagram for illustrating an example of a communication route used when the terminal 20 accesses a closed network via the antenna 17 outside the site. In the example of FIG. 8, it is assumed that the terminal 20 accesses the mobile communication network via the antenna 17 of the base station system 42, and the terminal 20 requests connection to the closed network. In this case, a communication control request is transmitted from the CU 46 to the AMF 47 in the core network system 41, and meanwhile, the UPF 49 in the site system 43 relays communication between the terminal 20 and the other systems (such as the voice communication system 61). Thus, the core control module (SMF 48) of the core network system 41 may control the UPF 49 included in the site system 43.

Further, as illustrated in FIG. 6 and FIG. 8, the AMF 47 controlling communication may differ depending on whether communication is via the antenna 15 in the site system 43 or via another antenna 17. In particular, as described in this embodiment, when the voice communication system 61 or the like outside the mobile communication network provides a call via a telephone network, there is less of a requirement for location information on the terminal 20 managed by the AMF 47, and thus an embodiment like this embodiment becomes possible.

When the terminal 20 accesses a closed network via the antenna 17 outside the site, a communication control request may be transmitted to the site control module (AMF 47) included in the site system 43. In this case, the CU 46 of the base station system 42 executes the same processes as the CU 46 of the site system 43 when a connection request from the terminal 20 is received.

In this embodiment, a secure connection is ensured by allowing the terminal 20 to access another system by using a closed network. Further, when the terminal 20 connects to the network slice of the closed network via the antenna 15 included in the site system 43, the control request is transmitted to the AMF 47 in the site system 43 instead of the core network system 41, and thus resistance to trouble can be increased. In other words, facilities such as the antenna 15 can be utilized more efficiently while maintaining security by providing access to an external network for visitors such as patients in a hospital and providing access to a closed network for staff such as nurses and doctors.

It should be noted that the present disclosure is not limited to the above-mentioned embodiment. The configurations disclosed in the embodiment may be combined in various ways. Further, within the scope of the technical idea of the present disclosure, a part of the configurations described in this embodiment may be modified.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware, for example, by an electronic circuit. Further, the functional unit in this embodiment may be implemented by a combination of an electronic circuit and software.

As can be understood from the above description of the embodiment, in the present application, a variety of technical ideas including the disclosure described below are disclosed.

(1) There is provided a communication system including: a site system arranged at a site and including an antenna and one or more processors; and a core network system connected to the site system and including one or more processors, the communication system causing at least one of the one or more processors included in the site system to execute: a site request process; a site control process of controlling communication by the terminal; and a site relay process of communicating to and from the terminal based on the control and relaying data acquired from the terminal to another system arranged at the site, the communication system causing at least one of the one or more processors included in the core network system to execute a core control process of controlling communication by the terminal, wherein, in the site request process, in response to a request for connection to a network slice of a predetermined closed network transmitted from the terminal via the site antenna, the site system is requested to execute the site control process on communication by the terminal, and in response to a request for connection to a network slice different from the network slice of the predetermined closed network transmitted from the terminal via the site antenna, the core network system is requested to execute the core control process on communication by the terminal in the network slice different from the network slice of the predetermined closed network, and wherein the site relay process for communication by the terminal via the site antenna is started in response to the request for the site control process by the site request process.

(2) In the communication system of Item (1), the communication system further includes an external system which includes an external antenna and one or more processors and which is installed externally to the site, and the communication system causes at least one of the one or more processors included in the external system to execute an external request process of requesting the core network system to execute the core control process on communication by the terminal in the network slice of the predetermined closed network in response to a request for connection to the network slice of the predetermined closed network transmitted from the terminal via the external antenna.

(3) In the communication system of Item (2), the site relay process on communication by the terminal is started in response to the request for the core control process by the external request process.

(4) In the communication system of any one of Items (1) to (3), the another system includes at least one of a SIP server, a nurse call system, or a database system.

(5) There is provided a communication control method including: causing at least one of one or more processors included in a site system arranged at a site to: control communication by a terminal; and communicate to and from the terminal based on the control and relay data acquired from the terminal to another system arranged at the site; causing at least one of one or more processors included in a core network system to control communication by the terminal; causing at least one of the one or more processors included in the site system to: cause, in response to a request for connection to a network slice of a predetermined closed network transmitted from the terminal via a site antenna included in the site system, at least one of the one or more processors included in the site system to control communication by the terminal, and cause, in response to a request for connection to a network slice different from the network slice of the predetermined closed network transmitted from the terminal via the site antenna, at least one of the one or more processors included in the core network system to control communication by the terminal in the network slice different from the network slice of the predetermined closed network; and starting relay between the terminal and the another system via the site antenna when the control of the communication by the at least one of the one or more processors included in the site system is started.

The invention claimed is:
1. A communication system, comprising:
a site system arranged at a site and including a site antenna and one or more processors; and a core network system connected to the site system and including one or more processors,
the communication system causing at least one of the one or more processors included in the site system to execute:
a site request process;
a site control process of controlling communication by a terminal; and
a site relay process of communicating to and from the terminal based on the control and relaying data acquired from the terminal to another system arranged at the site,
the communication system causing at least one of the one or more processors included in the core network system to execute a core control process of controlling communication by the terminal,
wherein, in the site request process, in response to a request for connection to a network slice of a predetermined closed network transmitted from the terminal via the site antenna, the site system is requested to execute the site control process on communication by the terminal, and in response to a request for connection to a network slice different from the network slice of the predetermined closed network transmitted from the terminal via the site antenna, the core network system is requested to execute the core control process on communication by the terminal in the network slice different from the network slice of the predetermined closed network,
wherein connection between the terminal and the network slice of the predetermined closed network is controlled by a first access and mobility management function (AMF), and connection between the terminal and the network slice different from the network slice of the predetermined closed network is controlled by a second AMF, and
wherein the site relay process for communication by the terminal via the site antenna is started in response to the request for the site control process by the site request process.

2. The communication system according to claim 1, further comprising an external system which includes an external antenna and one or more processors and which is installed externally to the site,
wherein the communication system causes at least one of the one or more processors included in the external system to execute an external request process of requesting the core network system to execute the core control process on communication by the terminal in the network slice of the predetermined closed network in response to a request for connection to the network slice of the predetermined closed network transmitted from the terminal via the external antenna.

3. The communication system according to claim 2, wherein the site relay process on communication by the terminal is started in response to the request for the core control process by the external request process.

4. The communication system according to claim 1, wherein the another system includes at least one of a SIP server, a nurse call system, or a database system.

5. The communication system according to claim 1, wherein the communication system causing at least one of the one or more processors included in the site system to execute the site control process in response to the request for connection including identification information of the network slice of the predetermined closed network.

6. The communication system according to claim 1, wherein the communication system causing at least one of the one or more processors included in the core network system to execute the core control process of controlling communication by the terminal in response to the request for connection including identification information for the network slice different from the network slice of the predetermined closed network.

7. The communication system according to claim 1, wherein the communication system causing at least one of the one or more processors included in the core network system to execute the core control process of controlling communication by the terminal in response to the request for connection failing to include identification information for any network slice.

8. The communication system according to claim 1, wherein the communication system causing at least one of the one or more processors included in the site system to execute the site relay process using a first user plane function (UPF), and the communication system causing at least one of the one or more processors included in the core network system to execute the core relay process using a second UPF.

9. A communication control method, comprising:
causing at least one of one or more processors included in a site system arranged at a site to:
control communication by a terminal; and
communicate to and from the terminal based on the control and relay data acquired from the terminal to another system arranged at the site;
causing at least one of one or more processors included in a core network system to control communication by the terminal;
causing at least one of the one or more processors included in the site system to:
cause, in response to a request for connection to a network slice of a predetermined closed network transmitted from the terminal via a site antenna included in the site system, at least one of the one or more processors included in the site system to control communication by the terminal, and cause, in response to a request for connection to a network slice different from the network slice of the predetermined closed network transmitted from the terminal via the site antenna, at least one of the one or more processors included in the core network system to control communication by the terminal in the network slice different from the network slice of the predetermined closed network,
wherein connection between the terminal and the network slice of the predetermined closed network is controlled by a first access and mobility management function (AMF), and connection between the terminal and the network slice different from the network slice of the predetermined closed network is controlled by a second AMF; and
starting relay between the terminal and the another system via the site antenna when the control of the communication by the at least one of the one or more processors included in the site system is started.

10. The communication control method according to claim 9, further comprising causing at least one of the one or more processors included in the site system to execute the site control process in response to the request for connection including identification information of the network slice of the predetermined closed network.

11. The communication control method according to claim 9, further comprising causing at least one of the one or more processors included in the core network system to execute the core control process of controlling communication by the terminal in response to the request for connection including identification information for the network slice different from the network slice of the predetermined closed network.

12. The communication control method according to claim 9, further comprising causing at least one of the one or more processors included in the core network system to execute the core control process of controlling communication by the terminal in response to the request for connection failing to include identification information for any network slice.

13. The communication control method according to claim 9, further comprising causing at least one of the one or more processors included in the site system to execute the site relay process using a first user plane function (UPF), and the communication system causing at least one of the one or more processors included in the core network system to execute the core relay process using a second UPF.

* * * * *